Jan. 12, 1926.
W. GREEN
1,569,744
REFRIGERATING SYSTEM AND PROCESS
Filed Dec. 20, 1922
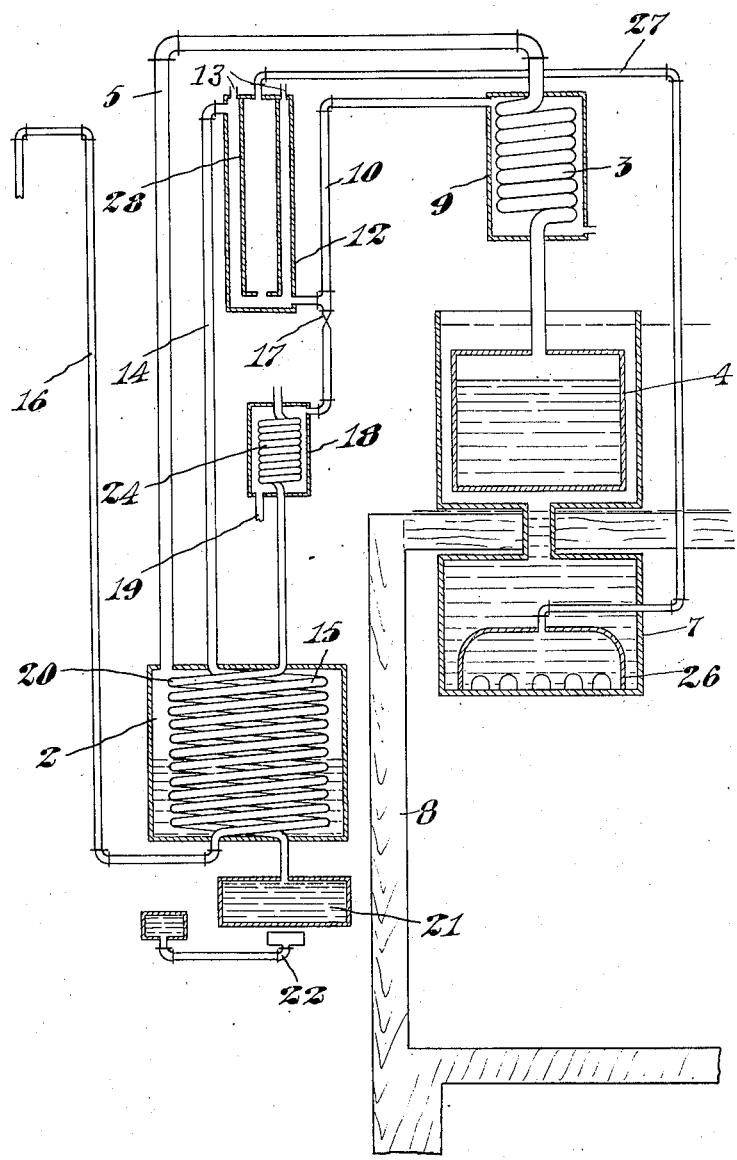
INVENTOR
William Green,
By his Attorney.
J. H. McCrady.

Patented Jan. 12, 1926.

1,569,744

UNITED STATES PATENT OFFICE.

WILLIAM GREEN, OF NEWTON, MASSACHUSETTS.

REFRIGERATING SYSTEM AND PROCESS.

Application filed December 20, 1922. Serial No. 608,079.

*To all whom it may concern:*

Be it known that I, WILLIAM GREEN, a citizen of the United States, residing at Newton, in the county of Middlesex and State of Massachusetts, have invented certain new and useful Improvements in Refrigerating Systems and Processes, of which the following is a specification.

This invention relates to refrigerating systems, and more especially to the intermittent absorption type of refrigerating systems. The invention is especially concerned with systems which are designed for use in those locations and in those classes of service where skilled attendants are not available, or where, for any reason, the system must operate practically without attention. Important examples of such systems are household refrigerators and other small refrigerating plants.

A great many attempts have been made heretofore to develop a satisfactory refrigerating system of the general type above mentioned designed to meet these requirements. While considerable progress has been made in this direction, still no system of which I have been able to learn has proved successful, chiefly for the reason that all such systems have required the use of automatic valves to control the flow of the refrigerant, and these valves after a time get out of order and render the entire system inoperative. It is the chief object of the present invention, therefore, to improve both refrigerating processes and systems of the intermittent absorption type with a view to avoiding the use of valves or equivalent devices for controlling the flow of the refrigerant.

The nature of the invention will be readily understood from the following description when read in connection with the accompanying drawings, and the novel features will be particularly pointed out in the appended claims.

In the accompanying drawings, the single figure is a diagrammatic view of a refrigerating system constructed in accordance with the present invention.

In the system shown, 2 designates the combined still and absorber, 3 the condenser, and 4 the expansion chamber. The absorber is connected with the condenser through a pipe 5, and the end of the condensing coil 3 runs directly into the expansion chamber 4 so that the condenser and expansion chamber are always in open communication with each other, affording a free passage for the flow of refrigerant between them at all times. This system is designed to employ any of the well known refrigerants adapted for use in an intermittent absorption system, ammonia being a common example of such a refrigerant. An absorbent of either solid or liquid form may be used, a solid absorbent such as ammonium nitrate being satisfactory. The expansion chamber 4 is located in a brine tank 7, which is formed in two sections, as shown, the upper section being outside the refrigerator box 8, while the lower section is located within said box. The two sections are so connected that a free passage for the flow of brine between them is afforded at all times.

The cooling water flows through the container 9 in which the condensing coil 3 is located, and thence, during the expansion cycle, through a pipe 10 into the bottom of a tank 12 and through an overflow pipe 14 to a coil 15 located in the absorber 2 and thence to the waste pipe 16. During the condensing period this water flows from the pipe 10 through a valve 17 and tank 18 to waste at 19.

The combined still and absorber 2 preferably contains a coil 20, the lower end of which is connected with a boiler or tank 21 filled with some heavy, relatively non-volatile liquid, such as mineral oil. Heat is supplied to this tank or boiler by a burner 22 adapted to use a liquid hydro-carbon fuel. The upper end of the coil 20 is connected to a reflux condensing coil 24 located in the tank 18.

At the beginning of the expansion period of the cycle of operations of the system, the expansion chamber 4 will be partially or entirely filled with liquid ammonia, assuming that this is the refrigerant used in the system. Heat is absorbed from the brine and the ammonia will evaporate and its vapors will flow over into the absorber 2, where they will be taken up by the absorbent. This obviously results in chilling the walls of the expansion chamber 4. During this time the cooling water is flowing through the tank 9, pipe 10, tank 12, pipe 14 and coil 15, taking up heat chiefly as it flows through the coil 15 in the absorber.

When substantially all of the refrigerant has been evaporated the operations above described are reversed. That is, the burner 22 is lighted, thus heating the oil or other liquid in the boiler 21, with the result that the ammonia is distilled off and separated from the absorbent. Before, or at about the time that the burner 22 is lighted, the valve 17 is turned to cause the water to flow through the tank 18 and to drain the tank 12. This cools the reflux condenser coil 24 so that any vapors of the oil or other liquid used in the boiler 21 which are not condensed in the coil 20 will be condensed in the coil 24.

As the ammonia vapors are distilled off, they are condensed in the condenser 3 and the expansion chamber 4. It will readily be appreciated that it is very important indeed that the greater part of the condensation shall take place in the condenser 3 and only very little, if any, in the expansion chamber 4. It is for this reason that a valve of some type has been introduced between these elements in prior systems. As above indicated, an especially important feature of this invention consists in the elimination of this valve. I have found that the condensation can be controlled within limits sufficiently narrow for all practical purposes by varying the relative rates of heat transfer of the condenser and expansion chamber at a given temperature differential. I effect this control through the movement of the brine into and out of contact with the expansion chamber. At the beginning of the distillation portion of the cycle as the ammonia vapors come over through the condenser, the condensation naturally will tend to be greater in the expansion chamber than in the condenser, assuming other factors to be equal, because the temperature is lower in the chamber. Assuming brine still to surround the chamber 4, this condition would continue through the greater part of the distillation period. It is well known, however, that the rate of heat transfer from a solid to a liquid is very much greater than that from a solid to a gas, the ratio, roughly, being as one hundred to one. Consequently, I propose to move the brine out of contact with the expansion chamber at the beginning of the condensing step of the process so that the heat transfer of the condenser 3 for a given temperature difference will be about one hundred times as great as the heat transfer of the expansion chamber 4.

At the beginning of the condensing or distillation period the first condensation probably will occur in the expansion chamber, but due to the poor heat transfer the temperature of this chamber will quickly rise to a point at least as high as that in the condenser, and thereafter much the greater part of the condensation will take place in the condenser due to the rapid rate of heat transfer from the coil 3 to the cooling water. The condensed refrigerant will run by gravity into the expansion chamber and will collect there, the flow of refrigerant between the parts 3 and 4 being free and unimpeded at all times.

The above described movement of the brine may be effected in any suitable manner, but the drawing shows a very simple arrangement for performing this operation. According to this construction an air bell 26 is fixed in the bottom of the brine container 7 and is connected by means of a pipe 27 with the top of another bell 28 located in the tank 12, the bottoms of the bells being open. As above stated, the valve 17 is opened at the beginning of the condensing or distillation period, and the tank 12 drains. Consequently, the air is released from the bell 26 and the bell fills with brine, the upper level of the brine in the tank 7 dropping to a point below the bottom of the expansion chamber 4. When the condensation period has been completed, the valve 17 is closed and the burner 22 is extinguished. The water then flows again through the tank 12, filling this tank and trapping a substantial volume of air in the bell 28. A part of the air thus trapped is forced through the pipe 27 into the bell 26 thus displacing the greater part of the brine in the latter bell. By properly proportioning the parts 26, 27 and 28 the movement of the brine may be made such that it will submerge the expansion chamber 4 during the expansion cycle and will drop to a point below the bottom of the chamber 4 during the condensing cycle. One or more vent holes 13 are provided in the top of the tank 12 to permit the escape of air therefrom. The heat transfer to or from the chamber 4 thus is at a maximum during the expansion period, and at a minimum during the distillation or condensing period, the rate being about one hundred times greater, for a given temperature differential, in one case than in the other, due to the fact that in one case the transfer is between a solid and a liquid and in the other case between a solid and a gas.

It will now be appreciated that this invention eliminates the necessity for any valve mechanism whatever to control the flow of the refrigerant. It thus eliminates the most troublesome factor of prior systems.

No attempt has been made in this application to disclose a commercial form of apparatus, the drawing showing simply those parts of a system necessary to a complete understanding of this invention. It will be appreciated that the invention may be embodied in many forms without departing from the spirit or scope thereof, and that the process herein described may be successfully practiced in a great variety of forms of apparatus.

Having thus described my invention, what I desire to claim as new is:

1. In an intermittent absorption refrigerating system, the combination of an absorber, a condenser, connections enabling the refrigerant to flow freely at all times between said absorber and condenser, an expansion chamber into which the condensed refrigerant flows by gravity from said condenser during the condensing period, said condenser and chamber being constantly in free communication with each other, and means for varying the rate of heat transfer of said expansion chamber at a given differential temperature at different periods in the cycle of operations of the system.

2. In an intermittent absorption refrigerating system, the combination of an absorber, a condenser, connections enabling the refrigerant to flow freely at all times between said absorber and condenser, an expansion chamber into which the condensed refrigerant flows by gravity from said condenser during the condensing period, said condenser and chamber being constantly in free communication with each other, and means for making the rate of heat transfer of said expansion chamber at a given differential temperature substantially greater during the expansion period than during the condensing period.

3. In an intermittent absorption refrigerating system, the combination of an absorber, a condenser, connections for conducting refrigerant from said absorber to said condenser and vice versa, an expansion chamber for the refrigerant connected with said condenser and permitting a free flow of refrigerant between said condenser and chamber at all times, a container for holding a quantity of brine in contact with said expansion chamber, and means for causing the brine to be held in contact with said expansion chamber during the expansion period and out of contact therewith during the distillation period.

4. In an intermittent absorption refrigerating system, the combination of an absorber, a condenser, connections for conducting refrigerant from said absorber to said condenser and vice versa, an expansion chamber for the refrigerant connected with said condenser and permitting a free flow of refrigerant between said condenser and chamber at all times, and means arranged to be actuated by fluid pressure for holding said brine in contact with said expansion chamber during the expansion period and causing it to move out of contact with said chamber during the distillation period.

5. In an intermittent absorption refrigerating system, the combination of an absorber, a condenser, connections enabling the refrigerant to flow freely at all times between said absorber and condenser, an expansion chamber into which the condensed refrigerant flows by gravity from said condenser during the condensing period, said condenser and chamber being constantly in free communication with each other, a brine container within which said expansion chamber is located, and means for effecting a movement of the brine into contact with said expansion chamber during the expansion period and out of contact therewith during the distillation period.

6. In an intermittent absorption refrigerating system, the combination of an absorber, a condenser, connections for conducting refrigerant from said absorber to said condenser and vice versa, an expansion chamber for the refrigerant connected with said condenser and permitting a free flow of refrigerant between said condenser and chamber at all times, a refrigerator box, a brine tank located partly within and partly outside said box, said tank being arranged to hold the brine in contact with said expansion chamber, and means for causing the brine to remain in contact with said chamber during the expansion period but out of contact therewith during the distillation period.

7. In an intermittent absorption refrigerating system, the combination of an absorber, a condenser, connections for conducting refrigerant from said absorber to said condenser and vice versa, an expansion chamber for the refrigerant connected with said condenser and permitting a free flow of refrigerant between said condenser and chamber at all times, a refrigerator box, a brine tank located partly within and partly on top of said box, said expansion chamber being located within the upper part of said tank, and means for causing said brine to remain substantially out of contact with said chamber during the distillation period and for raising it and holding it in contact with said chamber during the expansion period.

8. In an intermittent absorption refrigerating system, the combination of an absorber, a condenser, connections for conducting refrigerant from said absorber to said condenser and vice versa, an expansion chamber for the refrigerant connected with said condenser and permitting a free flow of refrigerant between said condenser and chamber at all times, means for conducting a supply of cooling water through said condenser, a tank arranged to hold a body of brine in contact with said expansion chamber, and means for utilizing the flow of said cooling water to move said brine into and out of contact with said expansion chamber.

9. In an intermittent absorption refrigerating system, the combination of an absorber, a condenser, connections for conducting refrigerant from said absorber to said condenser and vice versa, an expansion chamber for the refrigerant connected with said condenser and permitting a free flow of refrigerant between said condenser and chamber at all times, a container for holding a quantity of brine in contact with said expansion chamber, and means for utilizing air pressure to move said brine into and out of contact with said chamber.

10. In an intermittent absorption refrigerating system, the combination of an absorber, a condenser, connections enabling the refrigerant to flow freely at all times between said absorber and condenser, an expansion chamber into which the condensed refrigerant flows by gravity from said condenser during the condensing period, said condenser and chamber being constantly in free communication with each other, a brine container within which said expansion chamber is located, and means for forcing air into said container to move the body of brine relatively to said chamber.

11. In an intermittent absorption refrigerating system, the combination of an absorber, a condenser, connections enabling the refrigerant to flow freely at all times between said absorber and condenser, an expansion chamber into which the condensed refrigerant flows by gravity from said condenser during the condensing period, said condenser and chamber being constantly in free communication with each other, a brine container within which said expansion chamber is located, an air bell located in said brine container, and means for forcing air into said bell to move said body of brine to change its relationship to said chamber.

12. In an intermittent absorption refrigerating system, the combination of an absorber, a condenser, connections enabling the refrigerant to flow freely at all times between said absorber and condenser, an expansion chamber into which the condensed refrigerant flows by gravity from said condenser during the condensing period, said condenser and chamber being constantly in free communication with each other, a brine container within which said expansion chamber is located, an air bell located in said brine container, another air bell outside of said container, a pipe connection between said bells, a tank in which the latter bell is located, and means for conducting water to said tank whereby changes in the level of the water in the tank operate to force air from the bell located therein into the bell in said container.

13. That improvement in intermittent absorption refrigerating processes which consists in evaporating a refrigerant in a suitable container, absorbing said refrigerant in a suitable medium, subsequently distilling off the refrigerant from said medium, condensing the refrigerant so distilled, permitting the refrigerant to flow by gravity from said condenser into said container during the distilling period, and controlling the point at which the greater part of the refrigerant will be condensed by varying the relative rates of heat transfer of said condenser and container.

WILLIAM GREEN.